US011996253B2

(12) United States Patent
Park

(10) Patent No.: US 11,996,253 B2
(45) Date of Patent: May 28, 2024

(54) HIGH VOLTAGE FUSE HAVING RING SEPARATION PREVENTION STRUCTURE

(71) Applicant: KOREA ELECTRIC TERMINAL CO., LTD., Incheon (KR)

(72) Inventor: Seo-Jun Park, Suwon-si (KR)

(73) Assignee: KOREA ELECTRIC TERMINAL CO., LTD., Incheon (KR)

( * ) Notice: Subject to any disclaimer, the term of this patent is extended or adjusted under 35 U.S.C. 154(b) by 272 days.

(21) Appl. No.: 17/610,823

(22) PCT Filed: Apr. 8, 2020

(86) PCT No.: PCT/KR2020/004764
§ 371 (c)(1),
(2) Date: Nov. 12, 2021

(87) PCT Pub. No.: WO2020/231012
PCT Pub. Date: Nov. 19, 2020

(65) Prior Publication Data
US 2022/0208500 A1 Jun. 30, 2022

(30) Foreign Application Priority Data
May 14, 2019 (KR) ........................ 10-2019-0056494

(51) Int. Cl.
*H01H 85/175* (2006.01)
*H01H 85/042* (2006.01)
(Continued)

(52) U.S. Cl.
CPC ........ *H01H 85/042* (2013.01); *H01H 85/055* (2013.01); *H01H 85/165* (2013.01); *H01H 85/175* (2013.01)

(58) Field of Classification Search
CPC ............... H01H 85/042; H01H 85/055; H01H 85/165–1755; H01H 2085/0412–0414
See application file for complete search history.

(56) References Cited

U.S. PATENT DOCUMENTS 3,848,215 A * 11/1974 Kozacka .............. H01H 85/165 337/248
4,920,327 A * 4/1990 Arikawa ............ H01H 85/0411 337/252
(Continued)

FOREIGN PATENT DOCUMENTS

CN 2710145 Y 7/2005
CN 201435365 Y 3/2010
(Continued)

OTHER PUBLICATIONS

Lee, KR 20160081064 Translation (Year: 2016).*
(Continued)

*Primary Examiner* — Jacob R Crum
(74) *Attorney, Agent, or Firm* — Hauptman Ham, LLP

(57) ABSTRACT

There is disclosed a high voltage fuse having a ring separation prevention structure comprising a housing comprising a first housing body and a second housing body which are coupled to each other and formed in a cylindrical shape; a fuse element disposed in the housing; a pair of connectors which are project from both ends of the housing and connected to the fuse element; and a pair of rings which are insertedly coupled to end circumferences of the housing and heat-sealed at multiple locations.

3 Claims, 5 Drawing Sheets

(51) Int. Cl.

| | |
|---|---|
| ***H01H 85/055*** | (2006.01) |
| ***H01H 85/165*** | (2006.01) |

(56) References Cited

U.S. PATENT DOCUMENTS

| | | | | | |
|---|---|---|---|---|---|
| 5,214,406 | A * | 5/1993 | Reese | H01H 85/143 337/252 |
| 5,296,832 | A * | 3/1994 | Perreault | H01H 85/153 337/201 |
| 5,426,411 | A * | 6/1995 | Pimpis | H01H 85/165 337/186 |
| 2010/0328020 | A1 * | 12/2010 | Wiryana | H01H 85/175 337/232 |
| 2019/0214213 | A1 * | 7/2019 | Siegwald | H01H 85/165 |

FOREIGN PATENT DOCUMENTS

| | | | |
|---|---|---|---|
| CN | 204946845 | U | 1/2016 |
| CN | 105322346 | A | 2/2016 |
| CN | 106981406 | A | 7/2017 |
| CN | 206619576 | U | 11/2017 |
| CN | 208753252 | U | 4/2019 |
| JP | 5740768 | B2 | 7/2015 |
| KR | 20-0275923 | Y1 | 5/2002 |
| KR | 10-2013-0024244 | A | 3/2013 |
| KR | 10-2014-0083830 | A | 7/2014 |
| KR | 10-2015-0130691 | A | 11/2015 |
| KR | 10-2016-0081064 | A | 7/2016 |
| KR | 10-2016-0083342 | A | 7/2016 |
| KR | 10-2018-0049848 | A | 5/2018 |
| KR | 10-2018-0096842 | A | 8/2018 |
| KR | 10-2066173 | B1 | 1/2020 |
| WO | 2016/032237 | A1 | 3/2016 |

OTHER PUBLICATIONS

Kang, KR 20150130691 Translation (Year: 2015).*

Extended European Search Report dated Jun. 10, 2022, in connection with the counterpart European Patent Application No. 20805080.7.

International Search Report issued for corresponding International Patent Application No. PCT/KR2020/004764 dated Jul. 31, 2020, along with an English translation.

Written Opinion issued for corresponding International Patent Application No. PCT/KR2020/004764 dated Jul. 31, 2020.

Office Action dated Aug. 15, 2023, for corresponding Chinese patent application No. 202080032983.0, along with a partial English translation (7 pages).

Chinese Notice of Allowance issued on Feb. 7, 2024, in connection with the Chinese Patent Application No. 202080032983.0 with its English translation, 6 pages.

* cited by examiner

HIGH VOLTAGE FUSE HAVING RING SEPARATION PREVENTION STRUCTURE

CROSS-REFERENCE TO RELATED APPLICATION

The present application is a national stage filing under 35 U.S.C § 371 of PCT application number PCT/KR2020/004764 filed on Apr. 8, 2020 which is based upon and claims the benefit of priorities to Korean Patent Application No. 10-2019-0056494, filed on May 14, 2019, in the Korean Intellectual Property Office, which are incorporated herein in their entireties by reference.

TECHNICAL FIELD

Disclosed herein is a high voltage fuse having a ring separation prevention structure.

BACKGROUND ART

Generally, a fuse is for cutting off power supply to electric parts when the electricity supplied from an electricity supply source (e.g., a battery) are overloaded on the electric parts.

There is one among such fuses that is applied to electric parts using a high voltage.

The fuse used at high voltage is likely to secondarily apply a shock to the electric parts as electricity is transmitted to the electric parts through the arc generated during the process that the element of the fuse is melted and cut by overload.

In addition, if the generated arc is transmitted to a housing, a fire is likely to occur and result in the loss of the electric parts.

To solve such disadvantages, it is necessary in the fuse used at such high voltage to interrupt the arc generated when the element is cut. For that, silica sand may be filled in a space for accommodating the element of the fuse to surround the element.

However, it is disadvantageously cumbersome to fill such silica sand in the space accommodating the element of the fuse.

While it is better to fill the silica sand in the space in the fuse without any gaps in a state where the coupling between the housing and the fuse element is complete. However, the silica sand has to be supplied in a state where the fuse element is located in a center of the housing. The fuse element might block the silica sand and the inside of the housing might fail to be filled with the silica sand enough to make an empty space. Such the empty space inside the housing is likely to deteriorate fire extinguishing performance, which is another disadvantage.

In addition, the fuse element may be secured in a state where some portion of the housing is not completely coupled and the portion of the housing may be coupled after the silica sand is injected. Accordingly, the coupling state of the housing might be unstable.

To solve such disadvantage, upper and lower housings are insertedly pressed and coupling rings may be inserted in both ends of the inserted upper and lower housings, respectively, so as to fix the both ends of the upper and lower housings in the conventional fuse.

However, the coupling rings of the conventional fuse may be secured to the both ends of the housing only by inserted pressing. If heat occurs in the housing, the housing and the coupling rings would be deformed by the heat and the coupling rings might separate from the both ends of the housing disadvantageously.

Cited references related to the present disclosure refer to Korean Patent No. 10-2016-0081064 (Open-laid date: Jul. 8, 2016).

DESCRIPTION OF INVENTION

Technical Problem

An object of the present disclosure is to provide a high voltage fuse having a ring separation prevention structure which may prevent the rings coupled to both ends of a housing from being separated from the housing by heat deformation.

Technical Solution

To achieve these objects and other advantages and in accordance with the purpose of the embodiments, the present disclosure may provide a high voltage fuse having a separation prevention structure.

The high voltage fuse having a ring separation prevention structure may include a housing comprising a first housing body and a second housing body which are coupled to each other and formed in a cylindrical shape; a fuse element disposed in the housing; a pair of connectors which are project from both ends of the housing and connected to the fuse element; and a pair of rings which are insertedly coupled to end circumferences of the housing and heat-sealed at multiple locations.

Heat-Sealing Grooves for the Heat-Sealing May be Formed between the multiple locations of the end circumferences of the housing and inner circumferences of the respective rings.

A plurality of guide ribs may extend from the multiple locations of the end circumferences of the housing in both directions.

In addition, the plurality of the guide ribs may slip-contact with the inner circumferences of the rings and guide the pair of the rings to be coupled to both end circumferences of the housing.

The plurality of the guide ribs may be formed in the heat-sealing grooves.

An outer surface of each guide rib may have a first incline which makes a first acute angle with an outer circumferential line of the housing.

Each heat-sealing groove may be formed between the first incline and the inner circumferential surface of each ring.

An inner circumference of each ring may have a second incline which gradually widens from a predetermined location of each inner circumference of the rings towards each outer circumference of the rings.

The heat-sealing grooves may be formed between the first incline and the second incline.

The second incline may make a second acute angle with an outer circumferential line of the housing.

The second acute angle may be more gentle than the first acute angle.

Predetermined roughness may be formed in the first and second inclines.

Advantageous Effects

The embodiments have following advantageous effects. The high voltage fuse having the ring separation prevention structure according to the present disclosure may have an advantage effect that the coupled rings to being separated from both ends of the housing by heat deformation may be prevented.

In addition, the high voltage fuse having the ring separation prevention structure according to the present disclosure may have an advantage effect that the overflow of the heat sealing portion may be prevented by providing the heat-sealing groove as the escape groove between the first incline and the first incline, considering the volume of the heat-sealing portion.

In addition, the guide ribs extending from the multiple locations of the outer circumference of each housing end on both sides may be further provided in the present disclosure. Accordingly, high voltage fuse having the ring separation prevention structure according to the present disclosure may have an advantage effect that the rings may be induced to be stably coupled to the outer circumferences of the both ends of the housing.

DETAILED DESCRIPTION OF EXEMPLARY EMBODIMENT

Figure 1:
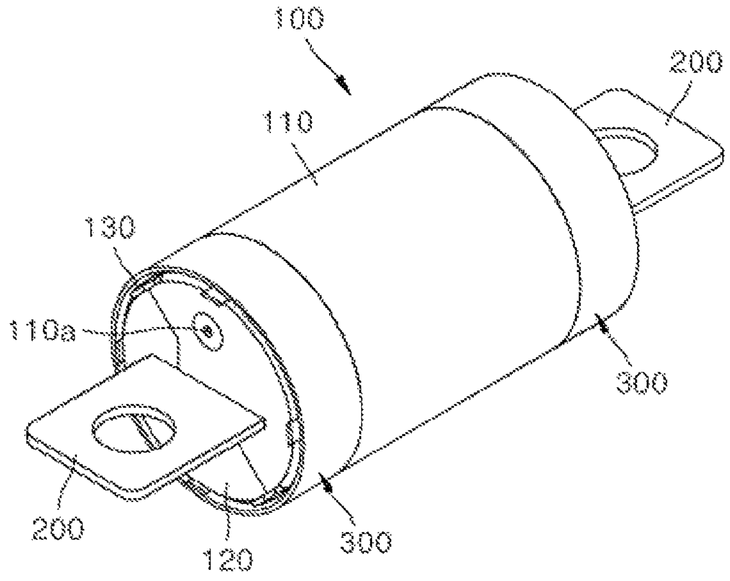
FIG. 1 is a perspective diagram showing a high voltage fuse having a ring separation prevention structure according to the present disclosure.

Hereinafter, the above-described aspects, features and advantages are specifically described hereunder with reference to the accompanying drawings such that one having ordinary skill in the art to which the present disclosure pertains easily can implement the technical spirit of the disclosure.

The present disclosure is not intended to limit the embodiments and drawings set forth herein, and numerous other modifications and embodiments can be devised.

In the disclosure, detailed descriptions of known technologies in relation to the disclosure are omitted to make the present disclosure understood clearly. In the drawings, identical reference numerals can denote identical or similar components.

Hereinafter, expressions of 'a component is provided or disposed in an upper or lower portion' may mean that the component is provided or disposed in contact with an upper surface or a lower surface.

The present disclosure is not intended to limit that other elements are provided between the components and on the component or beneath the component.

Referring to the accompanying drawings, a high voltage fuse having a ring-separation prevention structure according to the present disclosure will be described.

Figure 2:
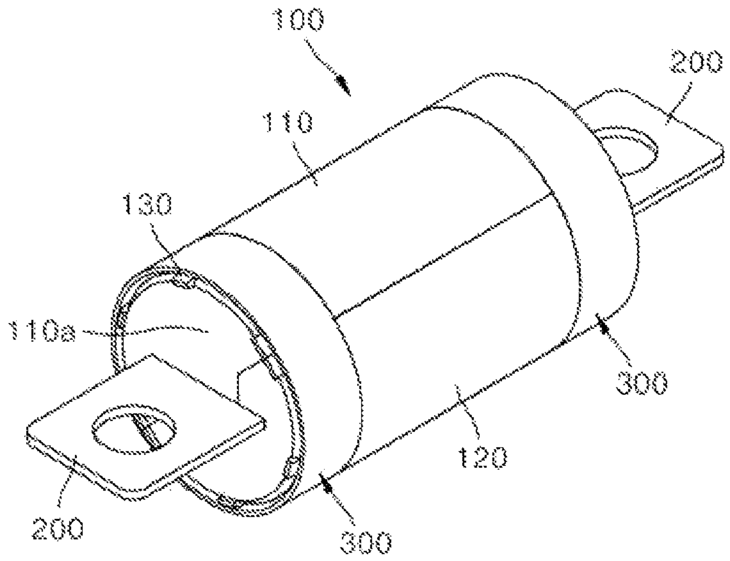
FIG. 2 is another perspective diagram showing the high voltage fuse having the ring separation prevention structure according to the present disclosure.
Figure 3:
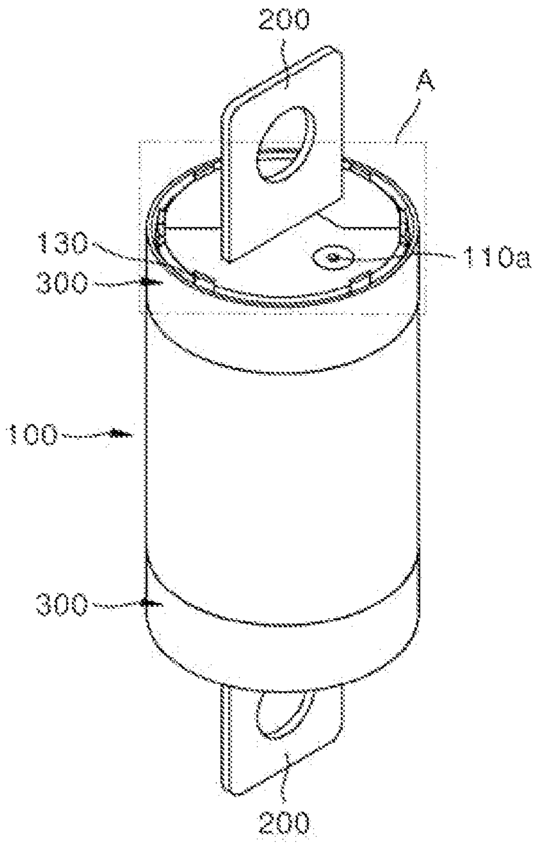
FIG. 3 is a further perspective diagram showing the high voltage fuse having the ring separation prevention structure according to the present disclosure.

FIG. 1 is a perspective diagram showing a high voltage fuse having a ring separation prevention structure according to the present disclosure. FIG. 2 is another perspective diagram showing the high voltage fuse having the ring separation prevention structure according to the present disclosure. FIG. 3 is a further perspective diagram showing the high voltage fuse having the ring separation prevention structure according to the present disclosure.

Referring to FIGS. 1 through 3, the high voltage fuse having the ring separations-proof structure according to the present disclosure may include a housing 100, a fuse element (not shown), a pair of connectors 200 and a pair of rings 300.

The housing 100 according to the present disclosure may include a first housing body 110 and a second housing body 120, which are coupled to each other and form a cylindrical shape.

In this instance, an introduction hole 110*a* may be formed in a predetermined portion of the first housing body 110. The introduction hole 110*a* is for introducing silica sand into the housing 110.

Although not shown in the drawings, the fuse element may be disposed in the housing 100.

The pair of the connectors 200 may be disposed and secured to both sides of the housing 100. The pair of the connectors 200 may be connected to both ends of the fuse eminent, respectively.

The pair of the connectors 200 may be used when the fuse is connected to other objects.

The pair of the rings 300 according to the present disclosure may be formed of metal having predetermined thickness and width.

In this embodiment, a stepped portion 101 may be formed in an outer circumferential area of each end of the housing 100.

The pair of the rings 300 may be forcibly pressed in the stepped portions 101 formed in the both ends of the housing 100, respectively.

Figure 4:
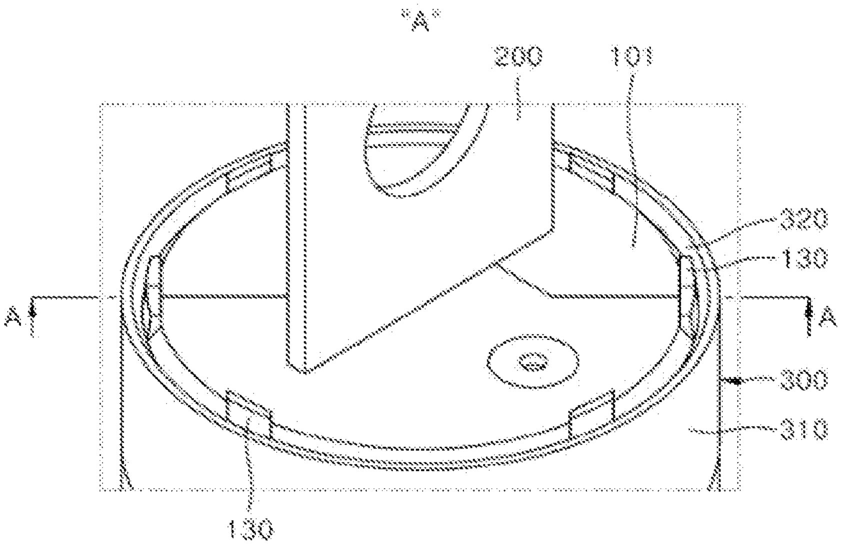
FIG. 4 is an enlarged perspective diagram showing A of FIG. 3.
Figure 5:
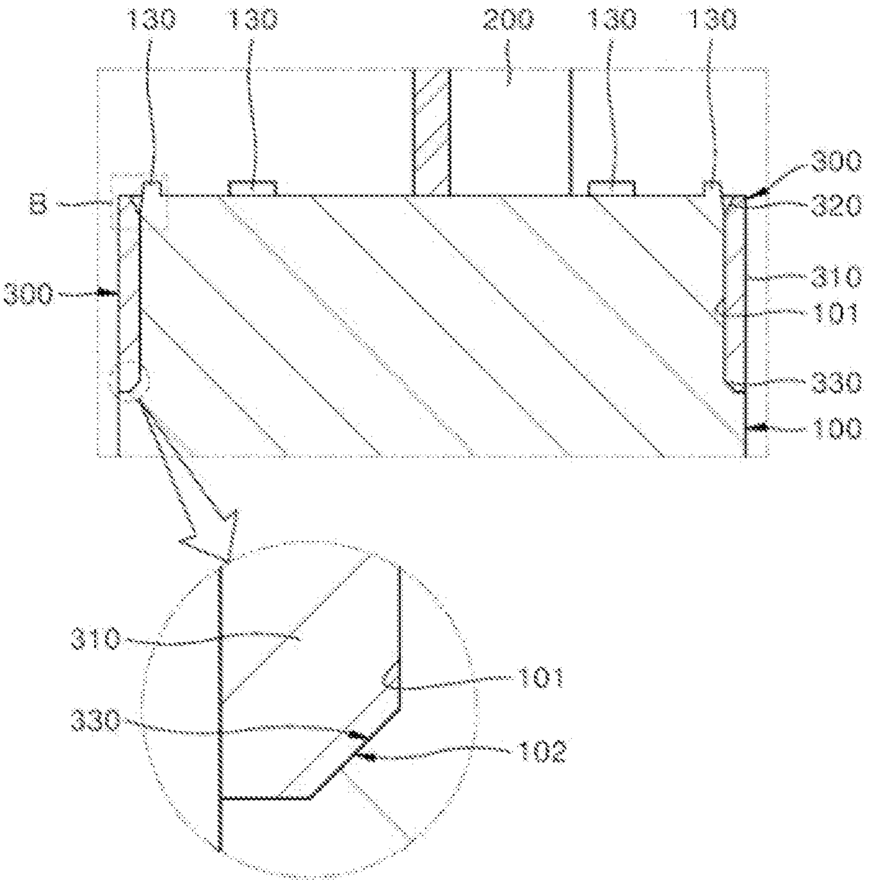
FIG. 5 is a sectional diagram along A-A of FIG. 4.
Figure 6:
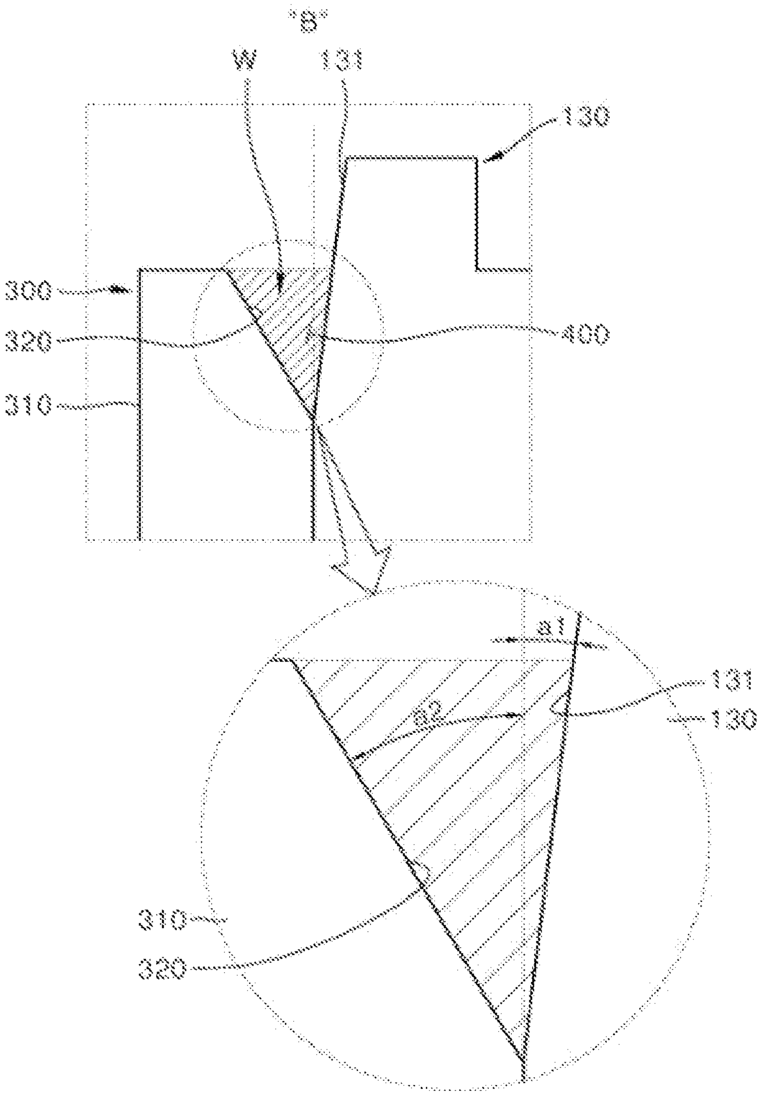
FIG. 6 shows B of FIG. 5.

FIG. 4 is an enlarged perspective diagram showing A of FIG. 3. FIG. 5 is a sectional diagram along A-A of FIG. 4. FIG. 6 shows B of FIG. 5.

Referring to FIGS. 4 through 6, the pair of the rings 300 according to the present disclosure may be formed in the same shape.

Each of the rings may have an inner diameter that is smaller than a diameter of the stepped portion 101, and it may also have predetermined thickness and width.

The thickness of the ring 300 may be substantially identical to the depth of the stepped portion 101.

The ring 300 according to the present disclosure may include a ring body 310 that is pressed in the stepped portion 101; a second incline 320 that is formed in one end of the ring body 310 and a cleaved plane 330 that formed in the other end of the ring body 310.

The second incline 320 may make a second acute angle with respect to an outer surface of the stepped portion 101.

Meanwhile, a plurality of guide ribs 130 may project from multiple locations provided in a circumferential area of the stepped portion 101 disposed in an outer circumferential area of each housing end, along both sides of the housing 100.

A first incline 131 may be formed in an outer surface of the each guide rib 130 and the first incline 131 may make a first acute angle a1 with an outer surface of the stepped portion 101.

In addition, an inner surface of each guide rib 130 may be orthogonal to a side surface of the housing 100.

The plurality of the guide ribs may be projected as the same length.

However, the widths of the guide ribs 130 may be different from each other.

The plurality of the guide ribs 130 may clip-contact with inner circumferential surfaces of the rings 300 to guide the pair of the rings 300 to be insertedly coupled to end circumferences of the housing 100.

The plurality of the guide ribs 130 may be formed to correspond to locations of heat-sealing grooves 400.

When each of the rings 300 is forcibly coupled to each of the stepped portions 101 formed in the ends of the housing 100, a heat-sealing groove 400 may be formed between the first incline 131 formed in the guide rib 130 and the second incline 320 formed in the corresponding ring 300.

Hence, a plurality of heat-sealing grooves 400 may be formed at multiple locations between the ring and the stepped portion 101.

A heat-sealing portion W may be formed in each of the heat-sealing grooves 400.

In this instance, as the heat-sealing portion W is formed in the heat-sealing groove 400, the volume in which the heat-sealing portion W is formed may increase and the problem of the heat-sealing portion overflow may be solved.

In addition, as the second acute angle a2 is more gentle than the first acute angle a1 as a gentle inclination angle, the volume of the heat-sealing portion W during the heat-sealing may increase to a preset level or more.

In addition, a close contact surface 102 may be formed in inner corners of the stepped portions and the close contact surface 102 may contact with the cleaved planes 330 formed in the other ends of the rings.

When the rings 300 are insertedly coupled to the stepped portions 101, the cleaved plane 330 may guide the rings to be smoothly coupled without being blocked by the circumferential ends of the stepped portions 101.

BEST MODE

Hereinafter, a method for securing the ring in a heat-sealing process after coupling it to the housing will be described.

Figure 7:
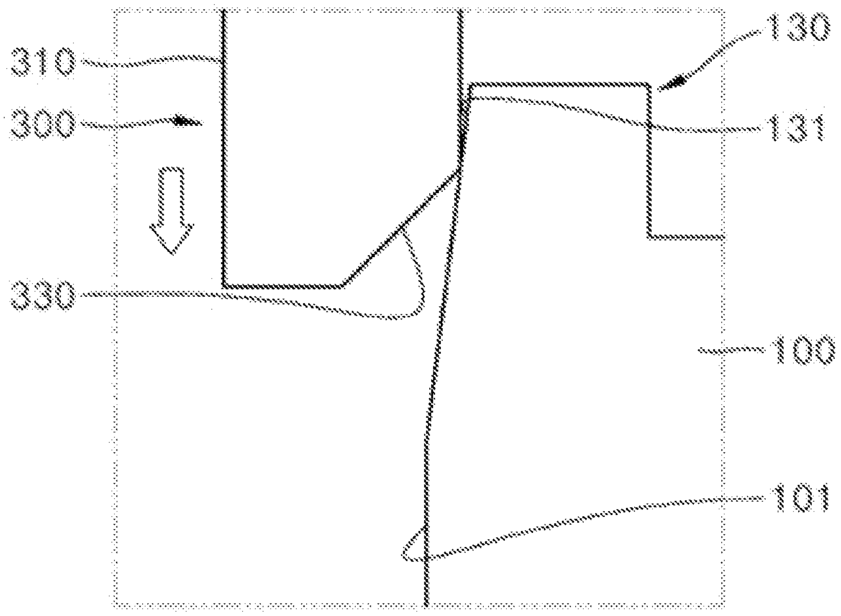
FIGS. 7 and 8 show a process in that the rings according to the present disclosure are insertedly coupled and heat-sealed to both ends of the housing.
Figure 8:
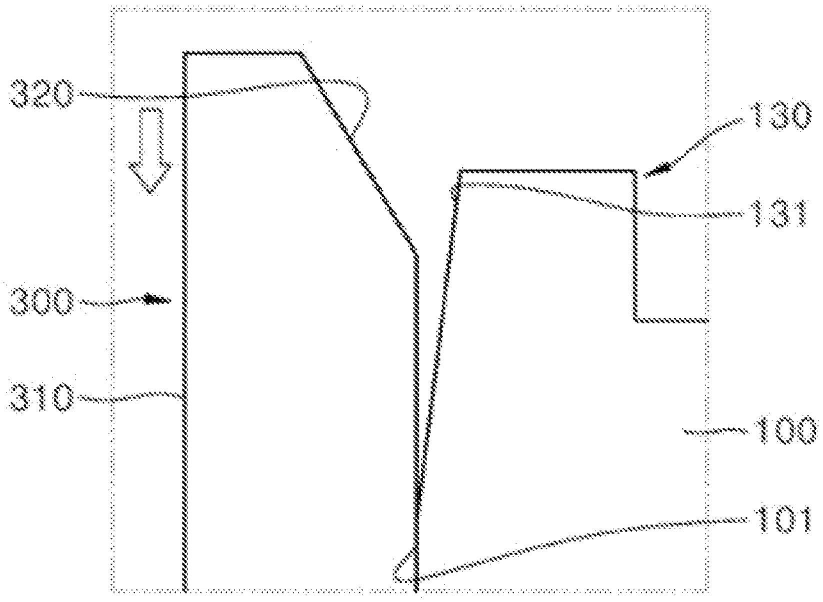

FIGS. 7 and 8 show a process in that the rings according to the present disclosure are insertedly coupled and heat-sealed to both ends of the housing.

Referring to FIGS. 7 and 8, the ring 300 according to the present disclosure may be insertedly coupled to the stepped portion 101 formed in each end of the housing 100.

In this instance, the cleaved plane 330 formed in the inner circumference of the other end of the ring 300 may be guided to be coupled to the stepped portion 101 as slip-contacting with the first incline 131 formed in the outer surfaces of the guide ribs 130 projected from the outer circumference of the stepped portion.

The other end of the insertedly coupled ring 300 may closely contact with the close contact surface 102 formed in the inner corner of the stepped portion 101.

Accordingly, the ring 300 may be secured to the outer circumference of the stepped portion 101 in a pressed-in process.

At the same time, the second incline 320 formed in the inner circumference of the one end of the ring 300 may make a V-shaped groove with the first incline 131 of the guide rib 130.

Accordingly, heat-sealing grooves 400 may be formed in multiple locations between the outer circumference of the end of the stepped portion 101 and the outer circumference of the end of the ring 300.

In addition, the guide ribs 130 may extend a predetermined length along both sides of the housing 100 from the stepped portions 101. The upper end of the guide rib 130 may be more projected than one end of the ring 300.

As described above, the plurality of the heat-sealing grooves 400 may be formed between the ring 300 and each of the stepped portions 101 formed in both ends of the housing 100. Heat-sealing portions W may be formed in the heat-sealing grooves 400 through heat-sealing of a base material.

The present disclosure may provide an escape space of a heat-sealing base material as large as the volume of the heat-sealing grooves during the heat-sealing process. Accordingly, the volume of the heat-sealing portions may increase by a predetermined amount that is enough to prevent the overflow of the heat-sealing base material outside the housing.

In addition, guide ribs may be further provided in multiple locations of the both end circumferences of the housing and the guide ribs may extend on both sides.

Meanwhile, although not shown in the drawings, the cleaved plane and the second incline may be formed into curved surfaces according to the present disclosure.

Specifically, the cleaved plane formed in the inner circumference of the other end of the ring may be curved into the curved surface. Then, the interference occurring when the ring contacts the outer circumference of the one end of the stepped portion may be prevented effectively.

In this instance, it may be preferred that the close contact surface formed in the inner corners of the stepped portion be formed in close contact with the cleaved plane formed in the above-mentioned curved surface.

Also, predetermined roughness may be further formed in the first and second inclines.

Based on the above-mentioned structure, the area between the first inclined and the second incline may be configured to be a heat-sealing groove in which a heat-sealing portion is formed.

Such roughness may be formed in the first and second inclines that directly contacts the base material during the heat-sealing, such that the contact area may increase enough to enhance the holding force based on the heat-sealing.

The embodiments are described above with reference to a number of illustrative embodiments thereof. However, the present disclosure is not intended to limit the embodiments and drawings set forth herein, and numerous other modifications and embodiments can be devised by one skilled in the art.

The foregoing embodiments are merely exemplary and are not to be considered as limiting the present disclosure. The present teachings can be readily applied to other types of methods and apparatuses. This description is intended to be illustrative, and not to limit the scope of the claims.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A high voltage fuse having a ring separation prevention structure comprising:

a housing comprising a first housing body and a second housing body which are coupled to each other and formed in a cylindrical shape;

a fuse element disposed in the housing;

a pair of connectors which are project from both ends of the housing and connected to the fuse element; and a pair of rings which are insertedly coupled to end circumferences of the housing and heat-sealed at multiple locations, wherein heat-sealing grooves for the heat-sealing are formed between multiple locations of the end circumferences of the housing and inner circumferences of the respective rings, a plurality of guide ribs extends from the multiple locations of the end circumferences of the housing in both directions, the plurality of the guide ribs slip-contacts with the inner circumferences of the rings and guide the pair of the rings to be coupled to both end circumferences of the housing, the plurality of the guide ribs is formed in the heat-sealing grooves, an outer surface of each guide rib has a first incline which makes a first acute angle with an outer circumferential line of the housing, each heat-sealing groove is formed between the first incline and the inner circumferential surface of each ring, an inner circumference of each ring has a second incline which gradually widens from a predetermined location of the inner circumference to an axial outer end of the inner circumference, and the heat-sealing grooves are formed between the first incline and the second incline.

2. The high voltage fuse having the ring separation prevention structure of claim 1, wherein the second incline makes a second acute angle with an outer circumferential line of the housing, and the second acute angle is more gentle than the first acute angle.

3. The high voltage fuse having the ring separation prevention structure of claim 1, wherein predetermined roughness is formed in the first and second inclines.

* * * * *